United States Patent [19]

Lowe

[11] 3,754,277

[45] Aug. 21, 1973

[54] TRACE IDENTIFYING MEANS FOR MULTIPLE TRACE RECORDER

[75] Inventor: Peter R. Lowe, Englewood, Colo.

[73] Assignee: Honeywell Inc., Minneapolis, Minn.

[22] Filed: Jan. 3, 1972

[21] Appl. No.: 214,616

[52] U.S. Cl. .................... 346/23, 346/45, 346/110

[51] Int. Cl. .................... G01d 1/00

[58] Field of Search .................. 346/23, 45, 49, 110

[56] References Cited

UNITED STATES PATENTS

| | | | |
|---|---|---|---|
| 2,489,253 | 11/1949 | Andre | 346/45 X |
| 3,081,458 | 3/1963 | Lee | 346/45 |
| 3,605,111 | 9/1971 | Schmoll | 346/62 |

*Primary Examiner*—Joseph W. Hartary

*Attorney*—Arthur H. Swanson, Lockwood D. Burton et al.

[57] ABSTRACT

In a multiple trace recording system of the type which might use a CRT as the writing instrumentality, means are provided for positively identifying each trace on the record. The identifying means includes means for printing, along one margin of the record member, ordinal numbers representative of the several input signal channels. The identifying means further includes means for generating a transverse trace line extending from a point adjacent to each of the imprinted numbers to a point of juncture with the corresponding data trace.

9 Claims, 2 Drawing Figures

PATENTED AUG 21 1973 3,754,277

SHEET 2 OF 2

TRACE IDENTIFYING MEANS FOR MULTIPLE TRACE RECORDER

The present invention relates to Recording Apparatus, and, more particularly to trace identifying means for multiple trace recorders.

In some prior art multiple trace identifying systems, each trace of the multiplicity of record traces is briefly interrupted in positions that are unique with respect to the interruption of the other traces. A numerical identification is simultaneously recorded in the margin of the record member to identify which channel is represented by the trace the interruption of which is aligned with the particular numerical indicator. A recorder of that type is illustrated in U.S. Pat. No. 3,167,382.

While such trace identification systems are generally effective, there are circumstances wherein the interrupted trace technique could be less than satisfactory. For example, when the signals being recorded undergo a rapid or high frequency fluctuation, an important bit of information may be lost during the interval of trace interruption.

It is,accordingly, an object of the present invention to provide an improved trace identification means for multiple trace recorders.

It is another object of the present invention to provide an improved multiple trace recorder having improved trace identifying characteristics.

It is a further object of the present invention to provide an improved trace identification system for multiple trace recorders which obviates the necessity for interrupting the identified traces.

In accomplishing these and other objects, there has been provided, in accordance with the present invention, means for identifying the individual traces of a multiple trace record by causing a transverse line to be formed on the record member extending from a channel identifying number, recorded on the record member near one margin thereof, and terminating at the trace corresponding to that input channel.

Figure 1:
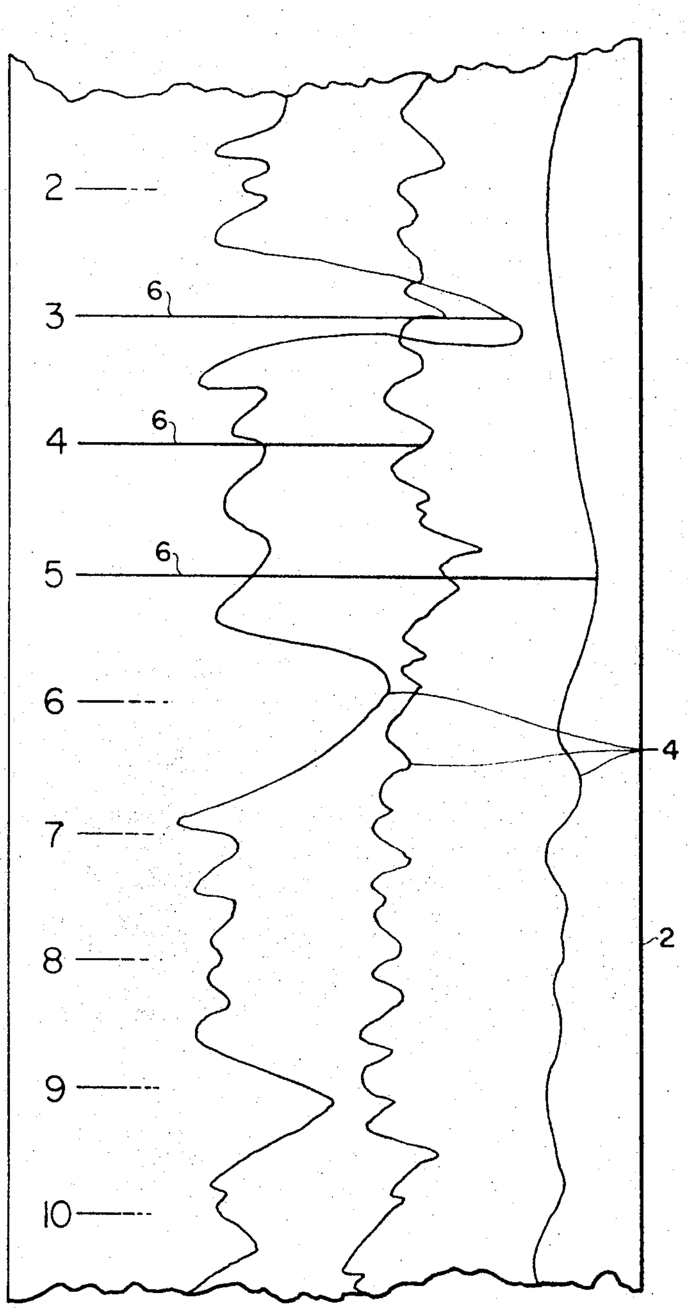
Figure 2:
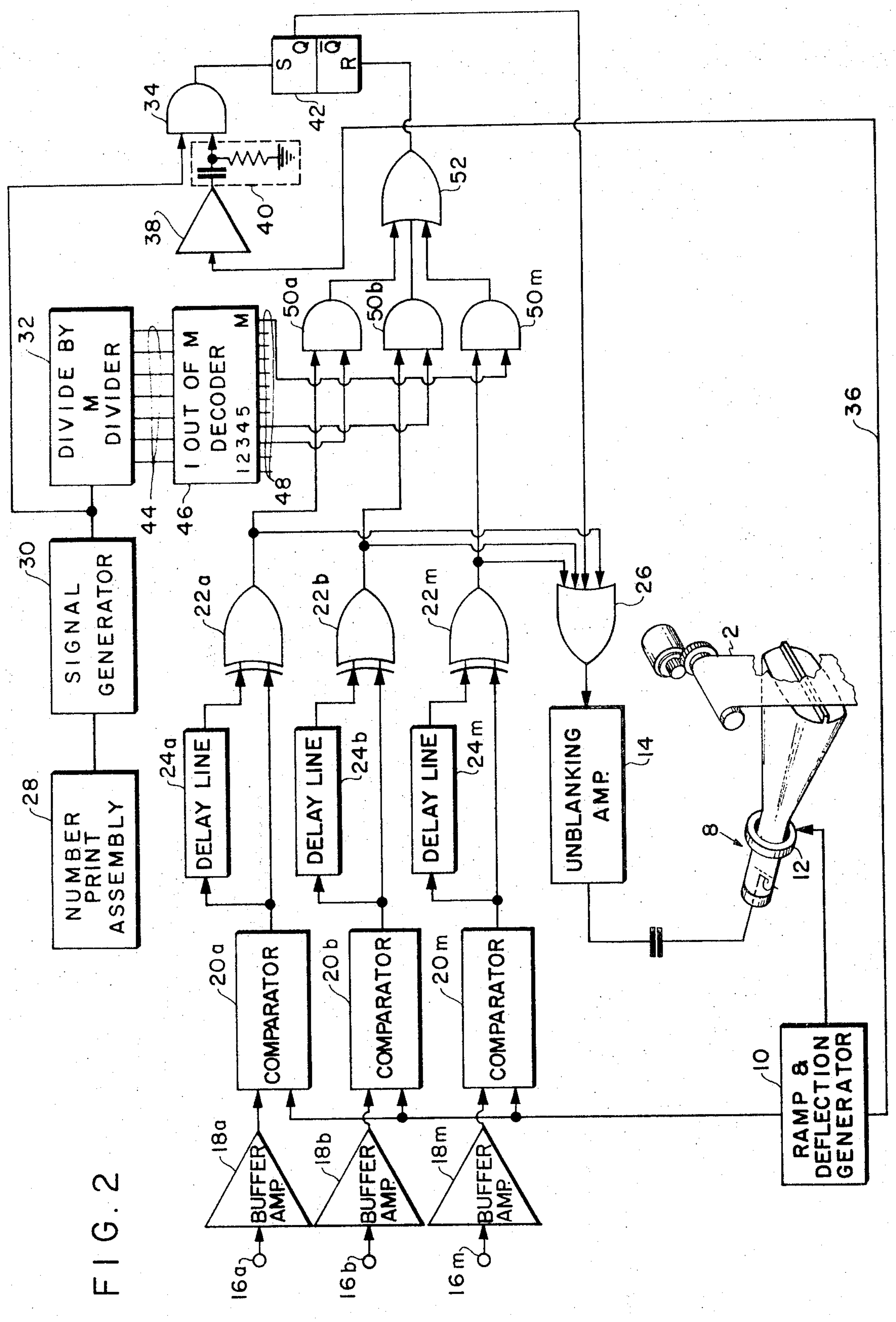

A better understanding of the present invention may be had from the following detailed description when read in conjunction with the accompanying drawings, in which:

FIG. 1 is a representation of a chart with trace identification indicia in accordance with the present invention, and FIG. 2 is a block-diagram of a system embodying the present invention.

Referring now to the drawings, in more detail, there is shown in FIG. 1 a record member 2 having a plurality of data traces 4 recorded thereon. Illustratively, there is shown a series of channel identifying numbers positioned along the left hand margin of the record member. Each of the marginal numbers represents an input data channel, data from which is recorded on the record member. In order to associate each of the channel identifying numbers with the corresponding trace on the record member, a transverse line 6 extends from a starting position adjacent to the identifying number to a terminating position just touching the trace to be identified therewith. Thus, each of the transverse line 6 positively identifies the appropriate trace without interfering with, or interrupting, the recording of the trace data.

In FIG. 2, there is shown a recording system embodying the present invention. In the illustrative embodiment, the multiple recorder, per se, is a recorder of the type shown and claimed in U.S. Pat. No. 3,605,109 issued in the name of Peter R. Lowe and Tommy N. Tyler, and assigned to the assignee of this invention. That recorder is fully described as to structure and operation in that patent, which description is incorporated by reference herein.

In the recorder, a cathode ray tube (CRT) 8 is employed to generate the data traces on a photosensitive record member 2. A ramp signal generator 10 produces a sawtooth ramp signal which is applied as a horizontal deflection signal to the deflection means 12 of the CRT 8. The beam of the CRT 8 is normally blanked until an unblanking signal is received from an unblanking amplifier 14. To generate the unblanking signals, a plurality of input terminals 16*a*, *b* – *m* are connected, respectively, to input buffer amplifiers 18*a*, *b* – *m*. The output of each of the buffer amplifiers 18 is connected to one input terminal of an associated comparator 20*a*, *b* – *m*. The other input terminal of each of the comparators 20 is connected, in common, to a ramp signal output terminal of the ramp generator 10. When the ramp signal matches, in magnitude, the output signal of any of the buffer amplifiers 18, the corresponding one of the comparators 20 produces an output signal which may be defined as a "logical 1." The output terminal of each of the comparators 20 is connected to one input terminal of an associated "exclusive OR" gate 22*a*, *b* – *m*. The delay lines 24*a*, *b* – *m*, also connected between the output of the comparators and another input of the gates 22*a*, *b* – *m*, respectively, are used to produce connected sample traces, as is fully explained and claimed in the aforesaid Lowe & Tyler U.S. Pat. No. 3,605,109. When a "logical 1" appears at either of the input terminals of the gates 22, the affected gates will be energized to produce a "logical 1" at the corresponding output terminals thereof. The output terminal of each of the gates 22 is connected to a separate input terminal of an "OR" gate 26. A logical "1" at any of the input terminals of the OR gate 26 produces an output signal from that OR gate to activate the unblanking amplifier 14. The momentary unblanking of beam of the CRT 8 results in a bright spot appearing at the face of the tube 8 which is, in turn, translated on to the record member 2 as a corresponding record trace.

The foregoing is all set forth in greater detail in the aforementioned U.S. Pat. No. 3,605,109.

It is assumed that the system thus far described is to be used to effect the recordation of a plurality of record traces on the record member and it will be desirable to be able to identify the several traces with a corresponding input channel. To this end, the input channels will be numbered for identification. Then, using known techniques such as print wheels or the like or even the technique shown in the aforementioned U.S. Pat. No. 3,167,382, numbers corresponding to the several input channels are imprinted along one margin of the record member as shown along the left hand margin of the record member shown in FIG. 1.

In FIG. 2, the means for effecting the printing of the channel numbers on the record member is shown in block diagram form as number printing assembly 28. A signal generator 30 is connected to the number printing assembly 28 to be acitvated thereby. Each time the print assembly 28 is actuated to index to the next number and print it on the record member, the signal generator 30 is activated to produce a pulse signal. The duration of the pulse signal thus produced is chosen to match the duration of the ramp signal produced by the ramp generator 10. In an exemplary embodiment, that pulse duration was 50 micro sec. That output pulse is applied to the input terminal of a divider 32 and to one input terminal of an AND gate 34.

The ramp generator 10 characteristically produces a signal having a sawtooth waveshape. That waveshape includes a ramp portion and a retrace portion. A trigger signal derived from the retrace portion of the sawtooth waveshape is applied, by a lead 36 connected to the ramp signal generator 10, through an inverter 38 and a differentiator 40, to the other input terminal of the AND gate 34. The coincidence of the 50 micro sec signal and the trigger signal at the two input terminals of the AND gate 34 produces a logical "1" output signal which is applied as an input signal to the "set" input terminal of a bistable element or flip-flop 42. The application of the logical "1" to the "set" input of the flip-flop 42 sets the flip-flop to produce a logical "1" at the true or Q output terminal thereof. The Q output terminal of the flip-flop 42 is connected to one of the input terminals of the OR gate 26. The application of that logical "1" from the flip-flop 42 to the input of the OR gate 26 causes the beam of the CRT 8 to be unblanked so long as the logical "1" exists at the input of the OR gate 26. Thus, as the beam is deflected by the ramp signal across the face of the CRT, a trace will be produced on the record member from a position representing the origin of the trace adjacent the imprinted channel indicating number to a point at which the logical "1" from the flip-flop 42 is removed.

A unique technique for terminating the logical "1" from the flip-flop 42 is provided. As previously noted, the output of the signal generator 30 is also applied to the input of a divider 32. The divider 32 may be in the form of a counter such as a plural stage decade counter having a divisor equal to the number of input channels. That is, if there are twenty input channels being recorded, the divider 32 divides the 50 micro sec. pulses by 20, the letter "M" in the drawing representing the number of input channels. Thus, each time the number print assembly prints a new number, the divider produces a unique output signal on the leads 44 which is representative of the particular number printed. These unique signals may be in any convenient code configuration. Accordingly, those signals are applied as input signals to a one-out-of-M decoder 46.

The decoder 46 has an "M" number of output leads 48, "M" again corresponding to the number of input channels. The decoder 46 operates to convert the unique signals from the divider 32 to an energization of a single one of the "M" output leads 48, the particular lead energized again being representative of the channel number printed by the number print assembly 28. Each of the output leads 48 is connected to one input terminal of a corresponding AND gate 50*a*, *b* – *m*. The other input terminals of the gates 50*a*, *b* – *m* are connected, respectively, to the corresponding output terminals of the OR gates 22*a*, *b* – *m*. The output terminals of each of the AND gates 50*a*, *b* – *m* is connected to a respective input terminal of an OR gate 52, the output of which is connected to the "reset" terminal of the flip-flop 42.

For any print cycle of the print assembly, one and only one of the gates 50 is enabled by a signal from the Decoder 46. Whenever a coincidence signal is received by that enabled gate 50 from its corresponding OR gate 22, a signal is produced at one of the inputs to the OR gate 52. That signal, in turn, results in a pulse being applied to the "reset" terminal of the flip-flop 42, causing the flip-flop to change its state of conduction, thereby removing the logical "1" from the Q output thereof. The removal of that logical "1" restores the CRT to its "blanked" condition.

Since the pulse which triggers the removal of the logical "1" from the output of the flip-flop 42 is identical to the pulse which produces the data trace corresponding to the selected input channel, the simultaneous occurrence results in the transverse identifying trace terminating at the point of juncture with the data trace. Thus the transverse identifying trace extends from a point adjacent the printed channel identifying number to a point of juncture with the corresponding data trace, thereby positively identifying the data trace with the identified input channel.

It should be noted that when a transverse identifying trace is initiated, it cannot be turned off by a data pulse in any but the selected input channel, even though a data pulse may appear in one of the other channels before one appears in the selected channel.

When the number print assembly 28 is indexed to print the next ordinal number, the divider 32, and hence the decoder 46, is also indexed to enable the AND gate 50 corresponding to the next numbered input channel. Simultaneously, a new identifying trace is initiated by the triggering of the flip-flop 42 again to its "set" condition. That identifying trace is, again, only terminated by a data pulse in the new data input channel. This process is repeated for each of the input channels being recorded.

Thus there has been provided, in accordance with the present invention, an improved recording system for recording a plurality of data traces on the same record and which includes means for positively identifying the several data traces with respect to the input channels and without interrupting any of the data traces.

I claim:

1. In a recording system including a recording means having control means therefor for recording a plurality of data traces on a record member, the improvement comprising first means for placing a series of data trace identifying indicia along a margin of said record member, and second means connected to said first means and to said control means and responsive to the control effected by the latter, and to the placing by said first means of each of said indicia on said record member, for producing a transverse indentifying trace starting at a point adjacent that indicia and ending at a point of juncture with the corresponding data trace.

2. The system as set forth in claim 1 wherein said second means includes;

a bistable element operable to either of a first or second stable condition, means for generating a first control signal connected to said first means, to said control means, and to said bistable element to actuate said bistable element to said first condition upon the placement of one of said indicia on said record member, and means connected to said control means and to said bistable element for generating a second control signal to actuate said bistable element to said second condition upon the operation of said recording means to record the data trace corresponding to said one of said indicia, said second means being responsive to the actuation of said bistable element to said first condition to initiate the production of said transverse identifying trace and responsive to the actuation of said bistable element to said second condition to terminate the production of said transverse identifying trace.

3. The system as set forth in claim 1 wherein said recording means includes:

a cathode ray tube having a controllable cathode ray beam, connections between said tube and said control means for enabling the latter to selectively blank and unblank said beam, means for periodically transversely deflecting said beam across the face of said tube, means responsive to said beam in its unblanked condition for producing record traces on said record member, and means included in said control means and responsive to each of a plurality of input signals individual to corresponding signal channels for selectively unblanking said beam at positions along the transverse deflection thereof representative of the magnitudes of said input signals to effect said recording of said data traces.

4. The system as set forth in claim 3 wherein said second means include:

means responsive to the production of each of said indicia for selectively unblanking said beam starting at a position along said transverse deflection adjacent that indicia, correlating means for correlating the produced indicia with the corresponding one of said signal channels, and means responsive to said correlating means for terminating the last mentioned selective unblanking of said beam upon the unblanking of said beam by said control means for the signal channel corresponding to said produced one of said indicia, thereby to produce a corresponding one of said transverse identifying traces.

5. The system as set forth in claim 4 wherein each signal channel includes:

a signal input terminal, a comparator connected to said input terminal for comparing the corresponding input signal with a predetermined ramp signal provided by a ramp generator, and gating means responsive to output signls from said comparator; wherein said correlating means comprises dividing and decoding means having a plurality of output leads corresponding in number to the number of signal channels, said dividing and decoding means including means for energizing said output leads singly and in sequence correlated with said production of said indicia, and a plurality of AND gate means, one for each signal channel, said AND gate means being actuated, respectively, by the coincidence of a signal on said output leads and a signal from a corresponding one of said gating means of said signal channels; and wherein the output signals of said AND gate means control said termination of the selective unblanking produced by said second means.

6. The system as set forth in claim 5 wherein said second means further includes:

a bistable element selectively operable to either of a first or a second stable condition, a signal generator connected and responsive to said first means for producing a first control signal each time one of said indicia is placed on said record member, means responsive to said first control signal to actuate said bistable element to said first condition, means responsive to said output signals from said AND gate means to actuate said bistable element to said second condition, and means responsive to the actuation of said bistable element to said first condition to unblank said cathode ray beam and responsive to the actuation of said bistable element to said second condition to terminate the last-mentioned unblanking of said cathode ray beam.

7. The system as set forth in claim 1, wherein said recording means includes a recording element for recording said data traces under the control of said control means, and wherein said second means has an additional connection to said recording means to control said recording element to cause said transverse identifying traces to be produced by said recording element under the control of said second means.

8. The system as set forth in claim 7, wherein said recording means includes means for repeatedly sweeping said recording element transversely of said record member in successive sweeps to record said data traces, and wherein said second means controls said recording element to make the latter operative to produce one of said transverse identifying traces during a selected one of said sweeps from the beginning thereof only to the point therealong at which said recording element records the corresponding one of said data traces.

9. The system as set forth in claim 8, wherein said recording element is a cathode ray beam which is unblanked by said control means at appropriate points in each of said sweeps to record said data traces, and wherein said second means, upon the placement of one of said indicia on said record member by said first means, unblanks said beam during one of said sweeps from the beginning thereof adjacent said one indicia only to the point along that sweep at which said beam is unblanked by said control means to record the corresponding one of said data traces.

* * * * *